US009874429B2

(12) United States Patent
Kawakami et al.

(10) Patent No.: US 9,874,429 B2
(45) Date of Patent: *Jan. 23, 2018

(54) THREE-DIMENSIONAL COORDINATE MEASURING MACHINE

(71) Applicant: TOKYO SEIMITSU CO., LTD., Hachioji, Tokyo (JP)

(72) Inventors: Tetsuji Kawakami, Hachioji (JP); Nobuhiro Okubo, Hachioji (JP); Kazuhisa Fusayasu, Hachioji (JP); Keiichiro Gomi, Hachioji (JP)

(73) Assignee: TOKYO SEIMITSU CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/244,972

(22) Filed: Aug. 23, 2016

(65) Prior Publication Data
US 2016/0356592 A1 Dec. 8, 2016

Related U.S. Application Data

(63) Continuation of application No. 14/324,764, filed on Jul. 7, 2014, now Pat. No. 9,441,935.

(51) Int. Cl.
G01B 5/00 (2006.01)
G01B 5/008 (2006.01)

(52) U.S. Cl.
CPC ........... G01B 5/008 (2013.01); G01B 5/0009 (2013.01)

(58) Field of Classification Search
CPC ........ G01B 11/005; G01B 1/00; G01B 5/008; G01B 21/045; G01B 5/0009; G01B 5/0014; G01B 21/04

(Continued)

(56) References Cited

U.S. PATENT DOCUMENTS 4,155,173 A * 5/1979 Sprandel ................ G01B 5/008
33/1 M
4,741,112 A 5/1988 Band et al.
(Continued)

FOREIGN PATENT DOCUMENTS

EP 0 393 795 10/1990
JP 2-296105 12/1990
(Continued)

OTHER PUBLICATIONS

Nikkan Kougyou Shimbun (Newspaper); "Compact Type CNC Three-Dimensional Coordinate Measuring Machine"; Apr. 13, 2012, p. 6; including English translation.

Primary Examiner — Yaritza Guadalupe-McCall
(74) Attorney, Agent, or Firm — Lewis Roca Rothgerber Christie LLP

(57) ABSTRACT

A three-dimensional coordinate measuring machine includes a base, a moving mechanism provided on the base, and a probe moved by the moving mechanism, the three-dimensional coordinate measuring machine measures coordinates of a surface position of an object to be measured by using the probe, the moving mechanism includes: a linear guide using a mechanical bearing; and an air bearing mechanism provided in parallel to the linear guide, one of ends of the moving part is attached to a linear moving unit that moves by the linear guide and the other is attached to the air moving part so that the other end can swing with respect to the air moving part, and the air bearing mechanism absorbs a difference in the height change between the linear guide and the air bearing mechanism by the air bearing.

2 Claims, 7 Drawing Sheets

(58) Field of Classification Search
USPC .......................................................... 33/503
See application file for complete search history.

(56) References Cited

U.S. PATENT DOCUMENTS

| | | | |
|---|---|---|---|
| 5,189,805 A | 3/1993 | Matsumoto et al. | |
| 5,347,723 A | 9/1994 | Russell | |
| 6,058,618 A | 5/2000 | Hemmelgarn et al. | |
| 6,428,210 B1* | 8/2002 | Kafai | F16C 29/025 |
| | | | 384/12 |
| 6,829,838 B1 | 12/2004 | Weekers et al. | |
| 9,441,935 B2* | 9/2016 | Kawakami | G01B 5/008 |
| 9,464,878 B1* | 10/2016 | Kawakami | G01B 5/0009 |
| 9,658,048 B2* | 5/2017 | Singh | G01B 5/008 |
| 2001/0022033 A1 | 9/2001 | Schroeder et al. | |
| 2004/0182176 A1 | 9/2004 | Huang | |
| 2004/0250434 A1 | 12/2004 | Ogura et al. | |
| 2007/0051179 A1 | 3/2007 | McMurtry et al. | |
| 2008/0040941 A1 | 2/2008 | Reynaerts et al. | |
| 2011/0313706 A1 | 12/2011 | Kawamura et al. | |
| 2012/0084989 A1 | 4/2012 | Pettersson et al. | |
| 2013/0111774 A1 | 5/2013 | McMurtry et al. | |
| 2013/0188895 A1* | 7/2013 | Devitt | F16C 32/0618 |
| | | | 384/121 |
| 2014/0068958 A1 | 3/2014 | Kubo | |
| 2014/0071460 A1 | 3/2014 | Suzuki | |
| 2014/0317942 A1 | 10/2014 | Sagemueller et al. | |
| 2015/0052769 A1 | 2/2015 | Noda et al. | |
| 2015/0077761 A1 | 3/2015 | Yamagata | |
| 2015/0285608 A1 | 10/2015 | Singh et al. | |
| 2015/0285616 A1 | 10/2015 | Jordil | |
| 2016/0003603 A1 | 1/2016 | Kawakami et al. | |
| 2016/0040987 A1 | 2/2016 | Bernhardt et al. | |
| 2016/0178362 A1* | 6/2016 | Iseli | G01B 5/008 |
| | | | 33/503 |
| 2017/0227343 A1* | 8/2017 | Singh | G01B 5/008 |

FOREIGN PATENT DOCUMENTS

| | | |
|---|---|---|
| JP | 2012-042267 | 3/2012 |
| JP | 2013-221820 | 10/2013 |

* cited by examiner

THREE-DIMENSIONAL COORDINATE MEASURING MACHINE

CROSS REFERENCE TO RELATED APPLICATION

This application is a continuation of U.S. patent application Ser. No. 14/324,764, filed Jul. 7, 2014. The entire contents of which are incorporated herein by reference.

BACKGROUND

Technical Field of the Invention

The present invention relates to a three-dimensional coordinate measuring machine, and particularly, to a moving mechanism of a three-dimensional coordinate measuring machine.

Related Art

A three-dimensional coordinate measuring machine is used to measure coordinates of an outline of an object. In the three-dimensional coordinate measuring machine, moving mechanisms that move in three-axis directions, i.e., an X-axis, a Y-axis, and a Z-axis orthogonal to one another, are sequentially configured on a base and a displacement measuring instrument is provided in a member (third moving part) capable of moving in the three-axis directions in the final stage, and then the coordinates of the surface position of an object are calculated by combining the displacement when a probe of the displacement measuring instrument is caused to come into contact with the outline of the object and the coordinate values in the three-axis directions at that time. The coordinates of the position to which each moving mechanism has moved serve as the base of the coordinates to be measured, and therefore, the coordinates of movement are required to be highly accurate.

The moving mechanism of the three-dimensional coordinate measuring machine etc. is implemented by using a linear guide.

FIG. 1A and FIG. 1B are diagrams illustrating a linear guide: FIG. 1A is a perspective view illustrating an external appearance and FIG. 1B is a section view.

The linear guide has a rail 1 and a moving unit 2 that slides and moves on the rail 1. As illustrated in FIG. 1B, the moving unit 2 is in contact with the rail 1 via bearing balls 3 and at the time of movement, the bearing ball 3 rotates. As illustrated in FIG. 1A, there exist rotation components P, Y, and R in three directions in which the moving unit 2 rotates with respect to the rail 1. P is called pitching, Y, yawing, and R, rolling.

When configuring a moving mechanism, in order to remove the influence of the above-described rotations, a plurality of linear guides is used. For example, two moving units that move on the same rail are attached to the same moving part. Due to this, it is possible to reduce the influence of the pitching P and the yawing Y. In this case, the rail is only one, and therefore, it is comparatively easy to perform attachment.

Further, there is a case where a plurality of rails and a plurality of moving units are used. For example, two rails are arranged in parallel and two moving units that move on each rail are attached to the same moving part. In this case, as described above, two moving units may be attached to each rail. In such a case, four moving units are used. Due to this, it is possible to reduce the influence of rolling R, in addition to that of the pitching P and the yawing Y.

FIG. 2 is a diagram illustrating a configuration example of a moving mechanism of a three-dimensional coordinate measuring machine. This configuration is a cantilever system.

The three-dimensional coordinate measuring machine has a base 11 formed of a stone surface plate of compound artificial marble etc., a Y column 21 provided on one of sides of the base 11, two Y-axis rails 22A and 22B provided in parallel on the Y column 21, a Y moving part 31 that moves on the Y-axis rails 22A and 22B, two X-axis rails 32A and 32B provided in parallel on the Y moving part 31, an X moving part 40 that moves on the X-axis rails 32A and 32B, a Z column 41 fixed to the X moving part 40 and which extends in the vertical direction, two Z-axis rails 42A and 42B provided in parallel on the Z column 41, and a Z moving part 50 that moves on the Z-axis rails 42A and 42B. To the Z moving part 50, a displacement measuring instrument 51 is attached and a measuring probe of the displacement measuring instrument 51 is caused to come into contact with the surface of an object to be measured. In the cantilever system moving mechanism, it is possible to access the top of the base 11 from any direction except from the backside, and therefore, there is an advantage that arrangement of an object to be measured, check of the contact position of the measuring probe, etc., can be performed easily.

Since two moving units are arranged on each rail, groups of four moving units are attached to the Y moving part 31, the X moving part 40, and the Z moving part 50. In the configuration in FIG. 2, the two rails provided in parallel are arranged in proximity to each other on the same surface of the same member, and therefore, it is possible to easily arrange them with a high degree of parallelization.

However, in the cantilever system moving mechanism in FIG. 2, although the Y moving part 31 is supported by the two rails 22A and 22B and the four moving units, the portion close to the end is supported, and therefore, displacement occurs on the other end due to bending. The amount of bending changes in moment as the X moving part 40 moves. In other words, the rigidity of the Y moving part 31 is insufficient.

In order to reduce the influence of bending (rigidity) of the above-described cantilever system moving mechanism, a configuration in which both ends of the Y moving part 31 are supported may be used.

FIG. 3 is a diagram illustrating another configuration example of the moving mechanism of the three-dimensional coordinate measuring machine. In FIG. 3, only the configuration for moving the Y moving part 31 is illustrated and the moving mechanisms of the other axes are not shown. The moving mechanism of the type in FIG. 3 is referred to as an L type.

The L-type moving mechanism of the three-dimensional coordinate measuring machine in FIG. 3 has the same configuration as that in FIG. 2 in that one of end parts of the Y moving part 31 is supported by the two Y-axis rails 22A and 22B provided in parallel on the Y column 21, but different from the configuration in FIG. 2 in that a support member 60 for supporting the end part on the opposite side of the Y moving part 31 is provided and the undersurface of the support member 60 is supported by a sub guide 61 arranged on the base 11. The sub guide 61 is, for example, a linear guide.

In the configuration in FIG. 3, the straightness of the sub guide 61 is required to be kept at a very high degree of accuracy. It is possible to represent an error of the straightness of the sub guide 61 as, for example, a variation in the height of the surface of the base 11. If the height 1 of the surface of the base 11 in the sub guide 61 changes by Δ1, the height of the end part on the opposite side of the Y moving part 31 also changes, but one end of the Y moving part 31 is supported by two linear guides of the Y column 21, and therefore, this is equivalent to being fixed. Because of this, the Y moving part 31 bends (warps) and the height of the end part on the opposite side changes by Δ2, resulting in equilibrium. If such bending occurs in the Y moving part 31, the Z moving part 50 inclines and the position of the measuring probe of the displacement measuring instrument 51 changes by Δ3, and therefore, an error in coordinate measurement occurs.

The bending of the Y moving part 31 changes accompanying the movement in the Y-axis direction and also changes depending on temperature etc. It is possible to correct to a certain degree the error in the contact position of the measuring probe due to bending of the Y moving part 31 by a correction formula calculated based on the measurement results of a reference object, but there is such a problem that it is difficult to accurately correct the influence by the change in the amount of bending.

FIG. 4 is a diagram illustrating a configuration example of the moving mechanism of the three-dimensional coordinate measuring machine. This configuration is a so-called bridge system.

In the bridge system three-dimensional coordinate measuring machine, two Y columns 21A and 21B are provided on the sides in opposition to each other on the base 11 and one Y-axis rail 22A is provided on the Y column 21A and one Y-axis rail 22B on the Y column 21B, respectively. In the case where two moving units are used on each rail, to the Y moving part 31, four moving units that move on the two rails 22A and 22B are attached. Other portions are the same as those in the case of FIG. 2.

In the bridge system three-dimensional coordinate measuring machine in FIG. 4, it is necessary to mount the rails after machining the rail attachment surfaces of the two Y columns 21A and 21B to which one set of rails is attached so that the degree of parallelization and straightness are of very high accuracy, and therefore, there is such a problem that the manufacturing costs will be very high. Further, in the bridge system three-dimensional coordinate measuring machine in FIG. 4, the access onto the base 11 is limited, and therefore, there is such a problem that it becomes difficult to arrange an object to be measured, to check the contact position of the measuring probe, etc.

There is also known a so-called gate type three-dimensional coordinate measuring machine in which the Y moving part 31 is formed into the shape like a gate and the Y-axis rails 22A and 22B are provided on the base, but the same problem as that described above exists because it is necessary to machine the bottom surface of the gate type Y moving part 31 so that the degree of parallelization and straightness are of very high accuracy.

RELATED DOCUMENTS

[Patent Document 1] US20110313706A
[Patent Document 2] JP2012-042267A

SUMMARY

As explained above, the cantilever system moving mechanism has such a problem that rigidity is insufficient and the bridge system moving mechanism and the L-type moving mechanism resembling the former have such a problem that the manufacturing cost will be increased because very high machining accuracy is required.

In order to solve the above-described problems, in the three-dimensional coordinate measuring machine of the present invention, one of end parts of a moving part is supported by a linear guide and the other end part is supported by an air moving part that moves along an air bearing slide guide part provided in parallel to the linear guide.

The three-dimensional coordinate measuring machine of the present invention includes: a base; a moving mechanism provided on the base; and a probe moved by the moving mechanism. The three-dimensional coordinate measuring machine measures coordinates of a surface position of an object to be measured by using the probe. The moving mechanism includes: a linear guide using a mechanical bearing; and an air bearing mechanism provided in parallel to the linear guide.

In the three-dimensional coordinate measuring machine of the present invention, in the case where the degree of parallelization and straightness of the linear guide and the air bearing slide guide part are insufficient and the relative height of the linear guide and the air bearing slide guide part changes depending on the position of movement, it is possible to absorb to a certain extent a difference in the height change by the air bearing. If the height of the other end part of the moving part changes, the inclination of the moving part changes, i.e., rolling occurs, but the moving part is supported by the linear guide, and therefore, it is possible to absorb this by the rolling R illustrated in FIG. 1A. Due to this, the inclination of the moving part, i.e., the rolling changes, but bending does not occur in the moving part. If there is no bending, the change due to an error has reproducibility, and therefore, it is possible to make highly accurate correction by applying the current correction technique and it is possible to control the position of movement with high accuracy. In other words, in the present invention, the rolling R, which has conventionally been suppressed as small as possible, is permitted positively and one of ends of the moving part is supported by the linear guide and the other is supported by the air bearing, and the change in the relative height of the portions supporting the moving part is absorbed by the air bearing, and then the change in the inclination of the moving part is absorbed by the rolling permitted for the linear guide and the link part in which an other end of the moving part can swing with respect to the air moving part.

Further, by the combined use of the linear guide, which is a mechanical bearing, and the air bearing, it is possible to reduce a reciprocating hysteresis by setting the friction surface only in the line of the mechanical bearing slide surface and installing a drive point, on which a drive power for moving the moving part is applied, on the friction surface.

The moving part may have the L-type configuration having a column illustrated in FIG. 3, the bridge type configuration having two columns illustrated in FIG. 4, or the gate type configuration with no column provided.

In the L-type configuration having a column, a column provided on one of sides of the base and having a mount surface parallel to the base surface is provided, a linear guide of the first axis moving mechanism is provided on the mount surface of the column, and the air moving part is attached to the support member provided on the other end part of the moving part and supported by the air bearing slide guide part provided on the base.

The moving part needs to be attached so that the moving part can swing with respect to the air moving part and this link part is configured so as to have, for example, a tip end part in the shape of a sphere and a receiving part for receiving the tip end part in the shape of a sphere, at least part of which is a conical surface.

According to the present invention, it is possible to implement a highly accurate three-dimensional coordinate measuring machine with a simple configuration and at a low manufacturing cost.

BRIEF DESCRIPTION OF THE DRAWINGS

FIG. 1A is a perspective view illustrating an external appearance and FIG. 1B is a section view;

DESCRIPTION OF THE PREFERRED EMBODIMENTS

Figure 1A:
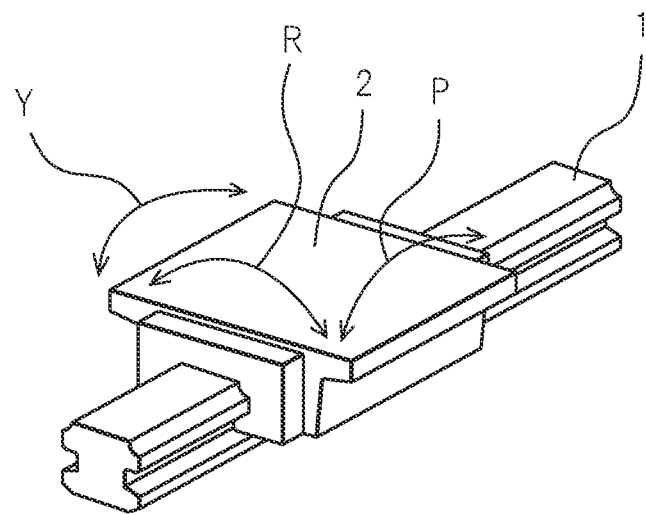
FIG. 1A and FIG. 1B are diagrams illustrating a linear guide.
Figure 1B:
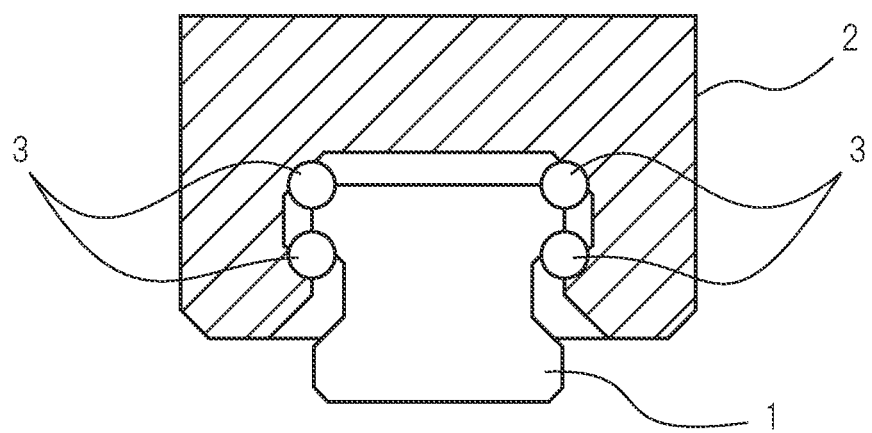
Figure 2:
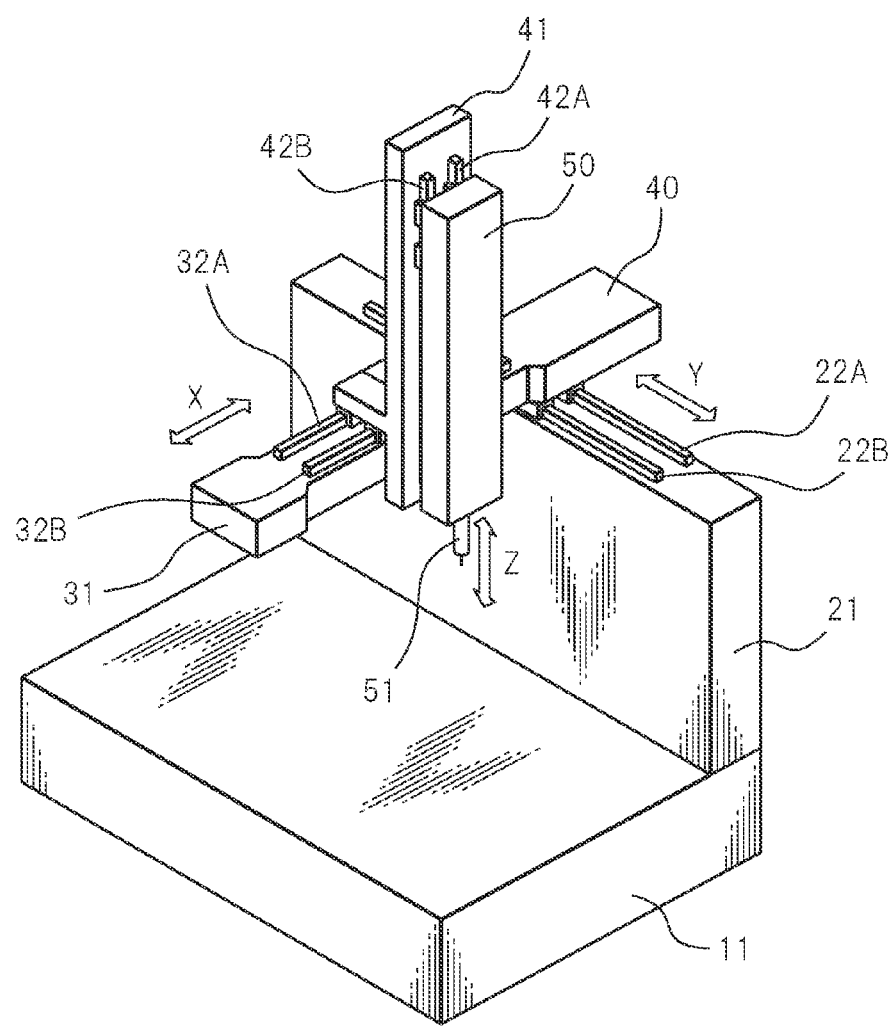
FIG. 2 is a diagram illustrating a configuration example of a moving mechanism of a three-dimensional coordinate measuring machine.
Figure 3:
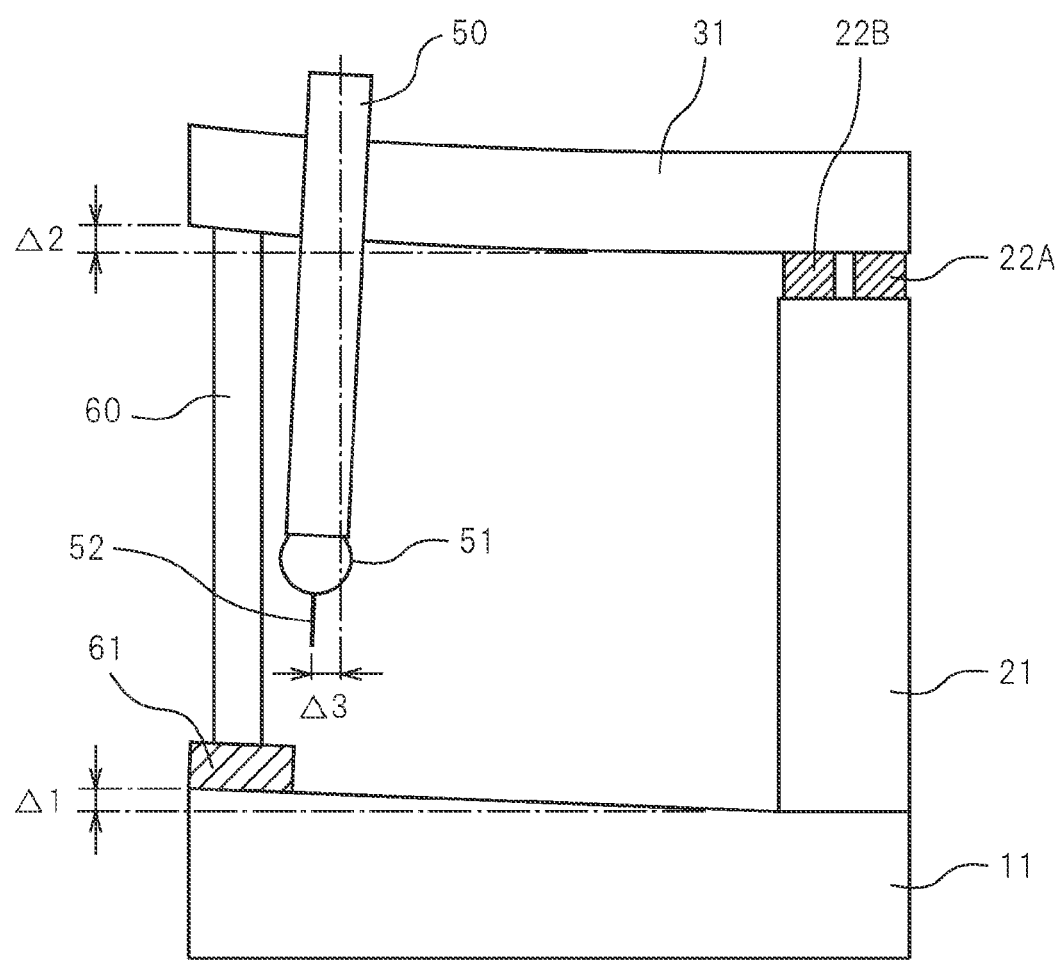
FIG. 3 is a diagram illustrating another configuration example of the moving mechanism of the three-dimensional coordinate measuring machine.
Figure 4:
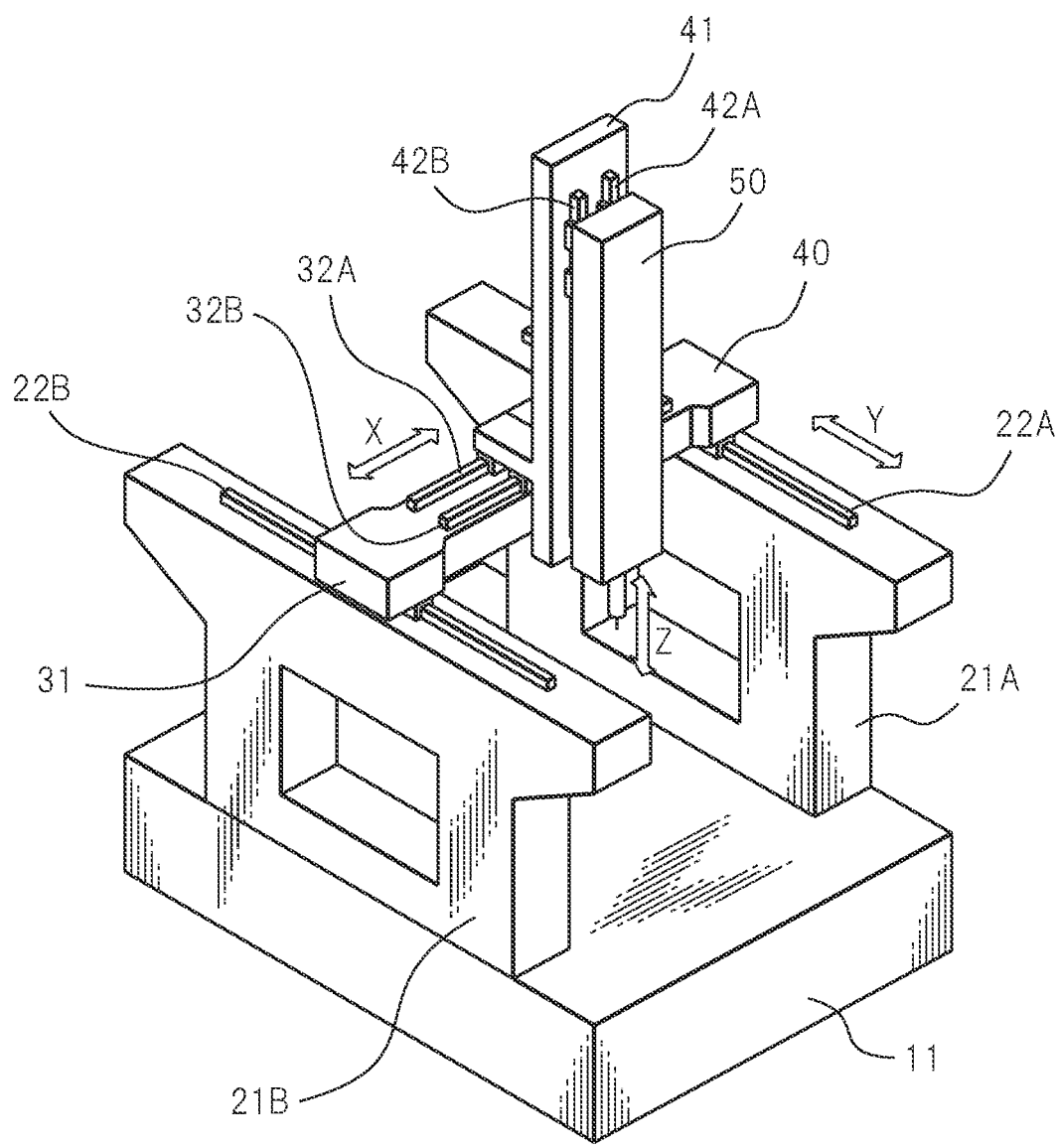
FIG. 4 is a diagram illustrating a configuration example of the moving mechanism of the three-dimensional coordinate measuring machine.
Figure 5A:
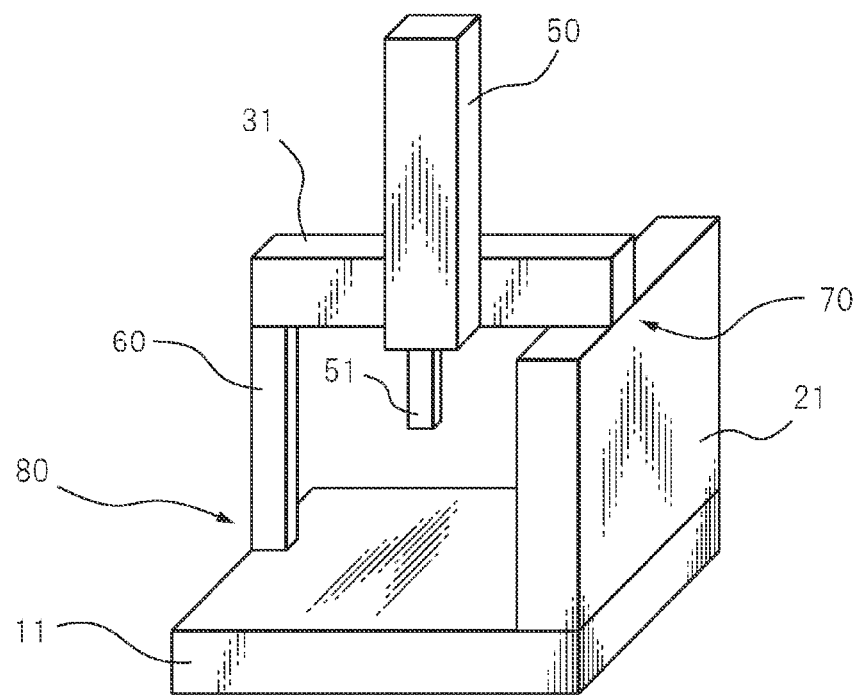
FIG. 5A and FIG. 5B are diagrams each illustrating a basic configuration of the three-dimensional coordinate measuring machine of the present invention.
Figure 5B:
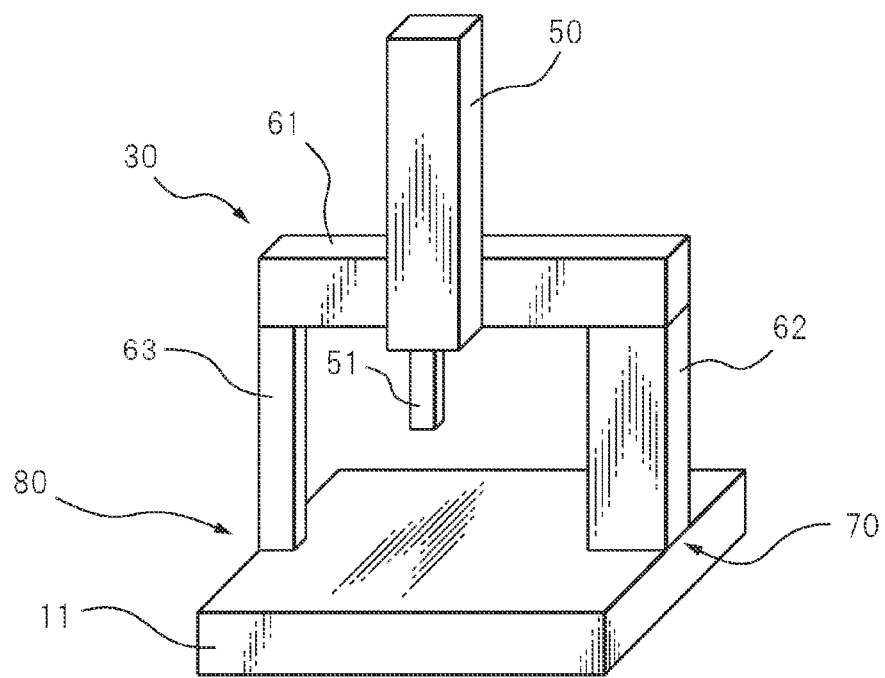

FIG. 5A and FIG. 5B are diagrams each illustrating a basic configuration of the three-dimensional coordinate measuring machine of the present invention. FIG. 5A illustrates the case of application to the L type having a column and FIG. 5B illustrates the case of application to the gate type. In FIG. 5A and FIG. 5B, only the configuration for moving the Y moving part is illustrated and the moving mechanisms of the other axes are not illustrated.

As illustrated in FIG. 5A, the L-type three-dimensional coordinate measuring machine to which the present invention is applied has the base 11, the Y column 21, the Y (first) moving part 31 that moves on the top surface of the Y column 21, and the support member 60 that supports the Y moving part 31. The Y column 21 is provided along one of sides of the base 11 and the top surface of the Y column 21 is parallel to the surface of the base 11. The Y moving part 31 is connected to the rail of one linear guide provided on the top surface of the Y column 21 via a liner moving unit and moves by the one linear guide. In FIG. 5A, the connection part of the Y moving part 31 and the one linear guide is denoted by reference numeral 70. The Y moving part 31 is further provided with the X-axis moving mechanism and the Z-axis moving mechanism and the coordinates of the position of the probe of the displacement measuring instrument 51 attached to the Z moving part 50 moves in the three-axis directions.

The other end part of the Y moving part 31 is supported by the support member 60. The lower part of the support member 60 is supported by the air moving part so that the other end can swing with respect to the air moving part. The air moving part and the air bearing slide guide part provided on the base 11 in parallel to the linear guide on the top surface of the Y column 21 configure an air bearing mechanism 80. Due to presence of the air bearing mechanism 80, even in the case where the relative height of the linear guide and the air bearing slide guide part changes, it is possible to absorb to a certain extent a difference in height change by the air bearing mechanism. Further, the lower part of the support member 60 is supported by the air moving part so that the other end of the Y moving part 31 can swing with respect to the air moving part and at the same time, even if the inclination of the Y moving part 31 changes, there is only one linear guide, and therefore, a certain magnitude of rolling can be absorbed. Due to this, even if rolling occurs in the Y moving part 31, bending does not occur in the Y moving part 31 and it is possible to control the position of movement with high accuracy by correction. Further, by the combined use of the linear guide, which is a mechanical bearing, and the air bearing, the friction surface can be set only in one line of the slide surface of the mechanical bearing, and therefore, it is possible to reduce a reciprocating hysteresis by installing the drive point on the friction surface.

In the L-type system moving mechanism illustrated in FIG. 5A, the linear guide is lifted up higher than the surface of the base 11, and therefore, it is possible to reduce the distance between the position of the center of gravity of the Y moving part 31 and the drive point (linear guide) compared to that in the gate type moving mechanism, to be explained next, and it is further possible to reduce the weight of the Y moving part 31. Due to this, it is possible to reduce pitching of the Y moving part 31 at the time of acceleration/deceleration and to reduce the drive force necessary to improve movement responsiveness or to implement the same movement responsiveness. Further, it is possible to easily access the top of the base 11 from any direction except for the backside, and therefore, it is possible to easily arrange an object to be measured and to check the contact position of the measuring probe.

A illustrated in FIG. 5B, the gate type three-dimensional coordinate measuring machine to which the present invention is applied differs from the case of the L type in FIG. 5A in that the Y column 21 is not provided and the configuration is formed into a gate type in which the Y moving part 31 is configured by the parallel portion 61, a first support member 62, and a second support member 63.

The lower part of the first support member 62 is supported by the connection part 70 with one linear guide provided along one of sides of the base 11. The lower part of the second support member 63 is supported by the air bearing mechanism 80 like the support member 60 in FIG. 5A.

In the gate type moving mechanism illustrated in FIG. 5B, both the linear guide 70 and the air bearing slide guide part of the air bearing mechanism 80 are provided on the top surface of the base 11, and therefore, it is easy to keep at high accuracy the degree of parallelization of the linear guide 70 and the air bearing slide guide part. On the other hand, there is such a problem that the gate type Y moving part 31 is heavy in weight compared to that of the L type illustrated in FIG. 5A and is easily affected by a pitch error.

In FIG. 5A and FIG. 5B, the examples of the L type and the gate type are explained, but it is also possible to similarly apply the present invention to other systems, such as the bridge type.

Figure 6A:
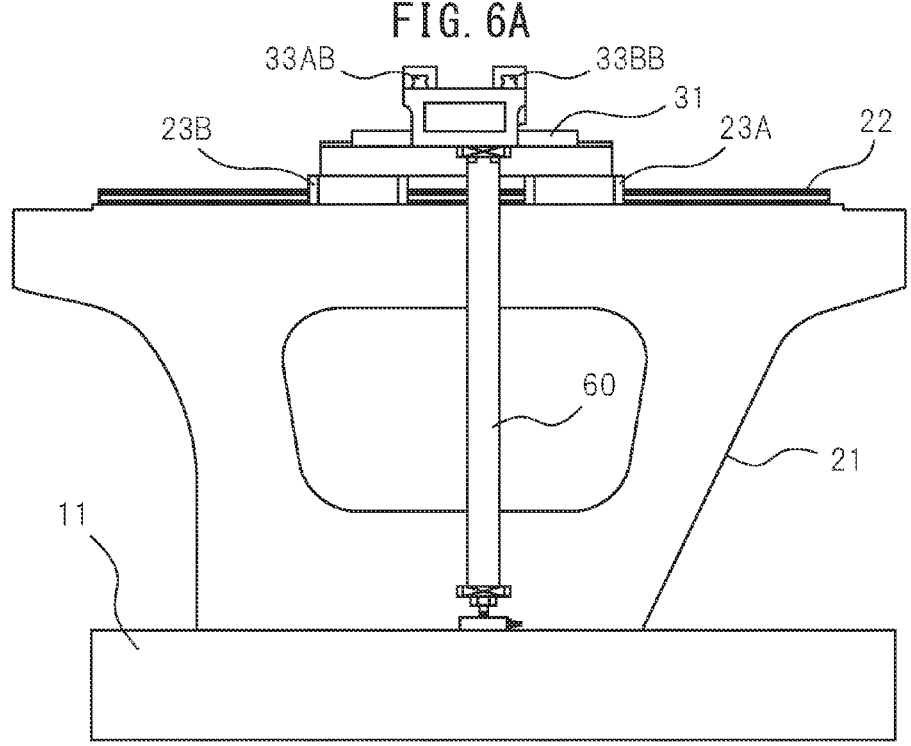
FIG. 6A and FIG. 6B are diagrams illustrating a configuration of a three-dimensional coordinate measuring machine of an embodiment in which the present invention is applied to the L type.
Figure 6B:
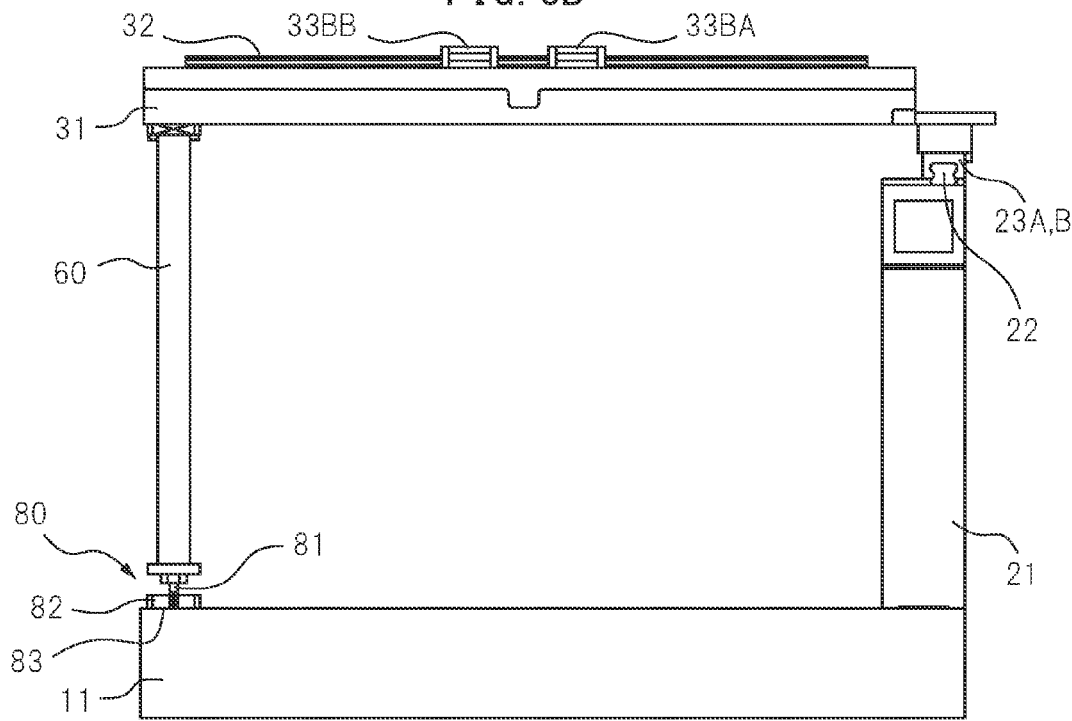

FIG. 6A and FIG. 6B are diagrams illustrating a configuration of a three-dimensional coordinate measuring machine of an embodiment in which the present invention is applied to the L type. FIG. 6A is a front view and FIG. 6B is a side view. In FIG. 6A and FIG. 6B, parts other than the Y moving part are the same as those of the conventional examples, and therefore, only the configuration for moving the Y moving part is illustrated and the moving mechanisms of the other axes are not illustrated.

The three-dimensional coordinate measuring machine of the embodiment has the base 11 formed by a stone surface plate of compound artificial marble etc., the hollow Y column 21 provided on one of sides of the base 11, one Y-axis rail 22 provided in parallel on the Y column 21, two Y moving units 23A and 23B that move on the Y-axis rail 22, the Y moving part 31 attached to the Y moving units 23A and 23B, two X-axis rails provided in parallel on the Y moving part 31, and four, in total, X moving units 33AA, 33AB, 33BA, and 33BB that move on the two X-axis rails. On these units, an X moving part etc. is configured, but it is not illustrated or explained.

To the end part of the Y moving part 31 on the opposite side of the side supported by the Y column 21, the cylindrical support member 60 is attached. The lower part of the support member 60 is supported by an air moving part 82 by means of a link mechanism 81 so that the end part of the Y moving part 31 can swing with respect to the air moving part 82. Along the side on the base 11 in opposition to the air moving part 82, an air bearing slide guide part 83 is provided. The air bearing slide guide part 83 is, for example, a groove having the width of the air moving part 82 extending in the Y-axis direction. The air moving part 82 jets out air supplied from the outside to the surface of the air bearing slide guide part 83 and is capable of moving in the Y-axis direction in the floating state at a fixed height. In other words, the air moving part 82 is capable of moving in the Y-axis direction, but does not change its position in the X-axis direction and is capable of changing its position by a finite amount in the Z-axis direction. Here, the portion configured by the air moving part 82 and the air bearing slide guide part 83 is referred to as the air bearing mechanism 80.

Figure 7:
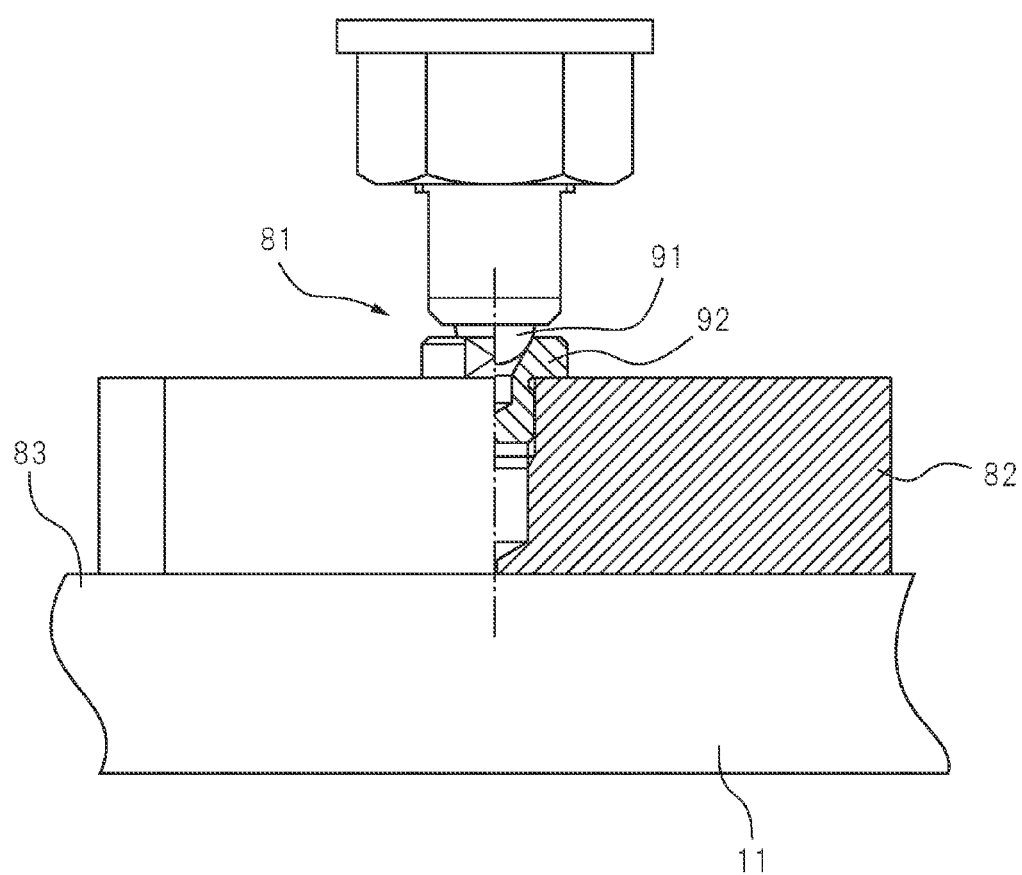
FIG. 7 is a diagram illustrating a configuration example of the link mechanism.

FIG. 7 is a diagram illustrating a configuration example of the link mechanism 81. As illustrated in FIG. 7, the air moving part 82 is arranged in opposition to the surface of the air bearing slide guide part 83 on the top surface of the base 11. The air moving part 82 has a receiving part 92 having a hole at least part of which is in the shape of a cone. At the tip end of the support member 60, a hemispherical tip end part 91 is provided and comes into contact with the hole in the shape of a cone of the receiving part 92. Here, the tip end part 91 is pressed against the cone-shaped hole of the receiving part 92 by the weights of the first moving part 31, the X- and Z-axis mechanisms configured thereon, the support member 60, etc. Due to this, the support member 60 (Y moving part 31) is supported by the air moving part 82 so that the Y moving part 31 can swing with respect to the air moving part 82.

Desirably, the relative height of the top surface of the Y column 21, i.e., the rail 22 of the one linear guide, and the surface of the air bearing slide guide part 83 is fixed, but some errors produced in manufacture are inevitable. In the embodiment, even in the case where the relative height of the rail 22 of the linear guide and the air bearing slide guide part 83 changes, it is possible to absorb to a certain extent a difference in height change by the air bearing mechanism 80. Further, the lower part of the support member 60 is supported by the air moving part so that the Y moving part 31 can swing with respect to the air moving part 82 and even if the inclination of the Y moving part 31 changes, there is only one linear guide, and therefore, it is possible to absorb a certain magnitude of rolling. Due to this, even if rolling occurs in the Y moving part 31, no bending occurs in the Y moving part 31 and only the Y moving part 31 inclines, and the amount of inclination has reproducibility, and therefore, it is possible to control the position of movement with high accuracy by correction.

Although the embodiments of the present invention are explained, the embodiments described above are merely for explaining the invention and it is possible for a person skilled in the art to easily understand that there can be various kinds of modified examples in the scope of claims.

What is claimed is:

1. A three-dimensional coordinate measuring machine comprising:
    a base;
    a moving mechanism provided on the base; and
    a probe moved by the moving mechanism, wherein the three-dimensional coordinate measuring machine measures an object to be measured arranged on the base by using the probe, and wherein
    the moving mechanism includes
    a linear guide using a mechanical bearing; and
    an air bearing mechanism provided on other side of the linear guide with respect to the probe and having an air moving part including a connecting mechanism, which is swingable with respect to the base.

2. The three-dimensional coordinate measuring machine according to claim 1, wherein a drive point of a moving part moved by the moving mechanism is provided on the linear guide side and is not provided on the air bearing mechanism side.

* * * * *